United States Patent [19]
Hollander

[11] Patent Number: 6,050,428
[45] Date of Patent: Apr. 18, 2000

[54] STORAGE SHELF SYSTEM

[75] Inventor: Rudolf R. Hollander, Vorden, Netherlands

[73] Assignee: NEDCON Magazijninrichting B.V., Netherlands

[21] Appl. No.: 08/999,639

[22] Filed: Aug. 25, 1997

[30] Foreign Application Priority Data

Aug. 24, 1996 [DE] Germany ............... 296 14 743 U

[51] Int. Cl.[7] .................................................. A47F 5/00
[52] U.S. Cl. ..................... 211/186; 211/135; 211/59.2; 211/187
[58] Field of Search .................. 211/59.2, 135, 211/153, 184, 186, 187

[56] References Cited

U.S. PATENT DOCUMENTS

| | | | |
|---|---|---|---|
| 1,473,064 | 11/1923 | Vance. | |
| 1,711,329 | 4/1929 | Short ................................ | 211/135 |
| 3,545,626 | 12/1970 | Seiz .................................. | 211/187 X |
| 4,048,059 | 9/1977 | Evans ................................. | 211/187 X |
| 4,742,925 | 5/1988 | Henderson. | |
| 5,022,535 | 6/1991 | Spamer ............................. | 211/187 X |
| 5,097,962 | 3/1992 | Eklof et al. ..................... | 211/184 X |
| 5,199,582 | 4/1993 | Halstrick. | |
| 5,593,048 | 1/1997 | Johnson ............................. | 211/59.2 |
| 5,806,689 | 9/1998 | Mays et al. ..................... | 211/187 X |

FOREIGN PATENT DOCUMENTS

| | | |
|---|---|---|
| 24 18 882 | 10/1975 | Germany. |
| 132000 | 8/1978 | Germany. |
| 3539369 | 5/1986 | Germany. |
| 3824328 | 12/1989 | Germany. |
| 296 01 819 U | 5/1996 | Germany. |
| 72 04 417 | 4/1971 | Netherlands. |

*Primary Examiner*—Robert W. Gibson, Jr.
*Attorney, Agent, or Firm*—Robert W. Becker & Associates

[57] ABSTRACT

A storage shelf system has vertical supports and horizontal beams connecting the vertical supports. Profiled shelves rest on the horizontal beams. Each one of the profiled shelves has at least one integral bearing surface and integral guide surfaces projecting upwardly past the at least one bearing surface.

10 Claims, 3 Drawing Sheets

STORAGE SHELF SYSTEM

BACKGROUND OF THE INVENTION

The present invention relates to a storage shelf system with vertical supports and with horizontally extending transverse beams that are connected to the vertical supports. Profiled shelves with formed bearing surfaces and guide surfaces for vertically supporting as well as laterally guiding the goods to be stored on the shelf system are arranged on the beams.

Such storage shelf systems are suitable first of all for warehouse-type storage facilities with automated computer-controlled placement into storage and removal from storage of parcel goods etc., for example, of containers or goods stored on pallets. The storage shelf system for this purpose is divided into a plurality of compartments arranged on top one another and adjacent to one another which, with respect to their depth, can extend to such a length that in each individual compartment a plurality of goods can be stored behind one another. For placing into storage or removing from storage it is necessary to slide the pieces or parcels within the compartment for which purpose an elongate planar bearing surfaces are required which support from below at least the longitudinal edges of the parcels or pieces and guides them during displacement laterally in order to prevent canting of the parcels or pieces within the compartment.

For providing individual compartments such a known shelf system for warehouse storage facilities is comprised of a system of vertical supports to which are connected horizontal beams at respective spacing for defining the height of the compartment.

The horizontal beams extend along the front and back side of the shelf system and serve, in addition to connecting the vertical supports, to support profiled members that extent at a right angle to the horizontal beams into the depth of the shelf system on which then the bearing surfaces for vertically supporting as well as the guide surfaces for laterally guiding the parcels or pieces are arranged. The profiled members are shaped as elongate angle pieces and are connected in pairs to the horizontal beams so that the supported pieces or parcels with their longitudinal edges are supported on the profiled members facing one another.

It is a disadvantage of such shelf systems that they are very labor intensive with regard to assembling them. Each profiled member must be connected to the forward and rearward horizontal beam and, furthermore, the distance between the left and the right profiled members that form together the compartment of the storage system must be exactly observed because only then a canting-free guiding of the goods between the profiled members is assured.

It is therefore an object of the present invention to provide a shelf system for storage facilities for receiving goods arranged behind one another in rows which can be mounted in a shorter period of time as compared to known shelf systems.

SUMMARY OF THE INVENTION

A storage shelf system according to the present invention is primarily characterized by:

Vertical supports;

Horizontal beams connecting the vertical supports;

Profiled shelves resting on the horizontal beams;

Each one of the profiled shelves having at least one integral bearing surface and integral guide surfaces projecting upwardly passed the at least one bearing surface.

Advantageously, the guide surfaces are positioned along opposed first and second longitudinal edges of the profiled shelf.

The first and second longitudinally edges have a C-shape with an upper and lower leg, wherein the open side of the C-shape faces a vertical center plane of the profiled shelf. The guide surfaces are located at an upper end of the C-shape and the lower leg of the C-shape is an abutment surface positioned below the at least one bearing surface and resting on the horizontal beams for supporting the profiled shelf on the horizontal beams.

Advantageously, the guide surface provided at the upper end of the C-shape is a slanted surface extending downwardly from the upper leg toward the vertical center plane where in the upper leg extends horizontally and wherein the C-shape has a vertical portion positioned opposite the open end and connecting the upper leg and the abutment surface.

Advantageously, the shelf system comprises a support surface, wherein two of the bearing surfaces are provided and wherein the support surface is located between the two bearing surfaces.

Advantageously, the shelf system further comprises a channel having a channel bottom, the channel positioned between the two bearing surfaces and lowered relative to the bearing surfaces. The two bearing surfaces are positioned within a common plane, and the support surfaces is located at the channel bottom.

Preferably, the support surface has openings distributed evenly across the surface area of the support surface.

Each one of the bearing surfaces is preferably comprised of two portions, and the depression is arranged between the two portions, wherein the depression has openings distributed evenly across the bottom surface of the depression.

The two portions of the bearing surface are free of openings.

Advantageously, this shelf system further comprises a travel limiter projecting upwardly past the at least one bearing surface for dividing the length of the at least one bearing surface into two sections that can be independently loaded with goods.

Preferably, the horizontal beams have a step for receiving the ends of the profiled shelves. The abutment surfaces at the ends of the profiled shelves are placed onto the steps. The at least one bearing surface is substantially flush with the upper surface of the horizontal beams. The guide surfaces project upwardly past the upper surface of the horizontal beams.

Advantageously, the guide surfaces extends centrally in a longitudinal direction of the profiled shelf and face away from one another. The bearing surfaces are positioned to the right and to the left of the guide surfaces.

According to the present invention, profiled shelves are provided as a shelf bottom having at least one bearing surface and comprising guide surfaces that are integrally formed with the profiled shelf and project past the at least one bearing surface.

The decisive advantage of such a shelf system is that each individual shelf bottom comprises the bearing surface for supporting the weight of the goods as well as the guide surfaces as integral parts.

Therefore, it is not required to attach these individual elements, for example, by screwing, to the basic construction of the shelf system; it is instead sufficient to simply insert the shelf bottom into suitable receiving units, e.g., receiving openings that are directly formed at the horizontal beams. It is also not required to adjust the spacing of the guide surfaces relative to one another. Since the guide surfaces are integrally formed together with the bearing surface at the shelf bottom, the correct spacing between the guide surfaces can be observed already during manufacturing of the individual shelf bottom so that at the assembly location it is only necessary to insert the shelf bottoms into the basic construction of the shelf system comprised of the vertical supports and the horizontal beams. Overall, in this manner a considerable saving with regards to time and labor is possible so that the inventive shelf system can be assembled at the location of prefabricated parts in a very short period of time.

In a preferred embodiment it is suggested that the guide surfaces projecting upwardly past the bearing surface extend along the two lateral edges of the profiled shelf and thus of the shelf bottom.

Furthermore it is suggested that the lateral edges of the profiled shelf have the cross-sectional design of a C-shape facing toward the center of the profiled shelf and that the guide surfaces are provided at the upper end of the C-shape while the C-shape at the lower end is provided with a support surface below the bearing surface of the shelf bottom so that the profiled shelf can be supported therewith on the horizontal beam. With this embodiment of the profiled shelf cross-section a high bending resistance of the profiled shelf in the longitudinal direction is provided so that even rather long shelf bottoms can be realized whereby downward bending or buckling even for goods of great weight is within relatively narrow limits.

For further improving the bending resistance of the individual profiled shelves, it is suggested that the upper end of the C-shape is of a trapezoidal shape, whereby the guide surface is the slanted portion of the trapezoid. The horizontal section connected thereto is the upper leg of the C and the vertically extending section of the C provides a connection to the lower leg of the C-shape. The lower leg of the C-shape is the support surface resting on the horizontal beam.

In order to reduce bending transverse to the longitudinal direction of the profiled shelf, according to a further embodiment it is suggested to provide a support surface which is positioned between two bearing surfaces of the profiled shelf. In a practical embodiment variant it is suggested that two bearing surfaces are arranged in a common plane and that between the two bearing surfaces a channel is provided that is lower than the bearing surfaces and has a bottom that provides the support surface.

For optimizing the shelf system with respect to fire-protective measures, the support surface can be provided with evenly distributed openings. Thus, when in the case of fire water is used for extinguishing the fire, the water can drain via the openings within the bottom of the channels so that the beaming surfaces can be designed of a substantially planar construction that and the goods can be displaced along the bearing surfaces with relatively minimal frictional resistance. For improving the permeability of the shelf bottom, it is furthermore suggested that the bearing surfaces are of a two part construction with a depression there between. The depression along its bottom is provided with openings. The depression preferably divides each bearings surface into two identical portions. The openings can be produced by stamping corresponding surfaces area with a stamping tool. Sharp-edged ridges result which, if they were present in the area of the bearing surfaces, would result in increased frictional resistance when moving the goods in the longitudinal direction the profiled shelf. For avoiding this disadvantage, it is thus suggested that the bearing surfaces themselves do not have openings.

Due to their high bending resistance, of the inventive profiled shelves it can be produced of relatively long length and can thus also extend over the length of two compartments arranged one behind another. In order to provide for a division of the profiled shelf into a shelf that can be accessed from the front and one that can be accessed from the rear, according to an embodiment of the present invention a travel limiter is provider which projects upwardly past the plane of the bearing surfaces and divides the entire length of the bearing surface into two longitudinal sections that can be individually loaded with different goods.

In order to simplify the insertion of the individual profiled shelves into the horizontal beams, it is suggested to provided the transverse or horizontal beams with a step facing the end of the profiled shelf to be received therein. The free end of the profiled shelf rests on the step with its abutment surfaces. The bearing surface is preferably flush with the upper side of the horizontal beam while the guide surfaces project upwardly past the upper surface of the horizontal beam.

BRIEF DESCRIPTIONS OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1–7.

Figure 1:
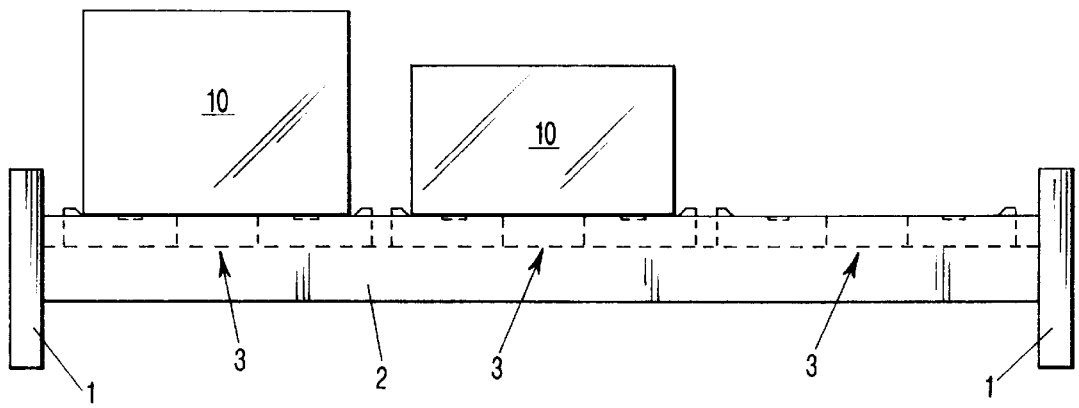
FIG. 1 is a front view of three compartments arranged in one plane adjacent to one another within a shelf system for a storage facility whereby two of these compartment contain goods.

FIG. 1 only represents a small section of an expansive shelf system for storage facilities. The basic structure of the shelf system is comprised of vertical support 1 and horizontal beams 2 which connect the vertical supports 1. The complete construction is stabilized in the manner of a truss system. The horizontal beams 2 are preferably connected to the vertical support 1 by screws. The shelf bottoms in the form of the elongate profiled shelves 3 rest on the horizontal beams 2. In the embodiment shown in FIG. 1, the length of the horizontal beams 2 is such that there is sufficient space for three parallel shelf bottoms or shelves 3. The profiled shelves 3 can abut directly or, as shown in FIG. 1, may be spaced at a small distance to one another whereby for this purpose non-represented spacer elements are inserted into the horizontal beams 2. For receiving the profiled shelves 3, at least two horizontal beams 2 are required whereby one horizontal beam is positioned at the front and the other horizontal beam is positioned at the rear of the shelf system.

Figure 2:
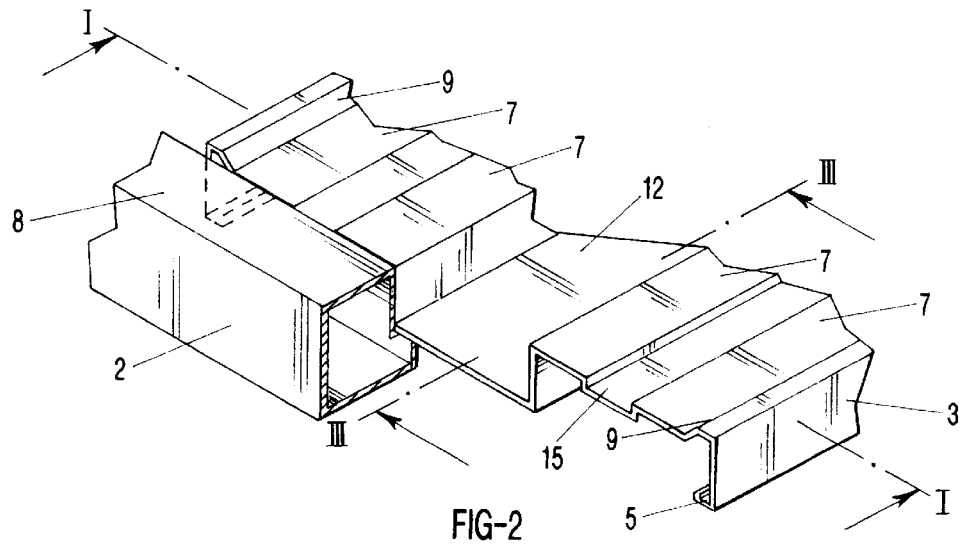
FIG. 2 shows in a prospective, partly sectional representation the connection between a horizontal beam of the shelf system and a shelf bottom resting on the horizontal beam and shaped as an elongate profiled shelf whereby the section plane I—I is shown that corresponds to the representation of FIG. 1.
Figure 3:
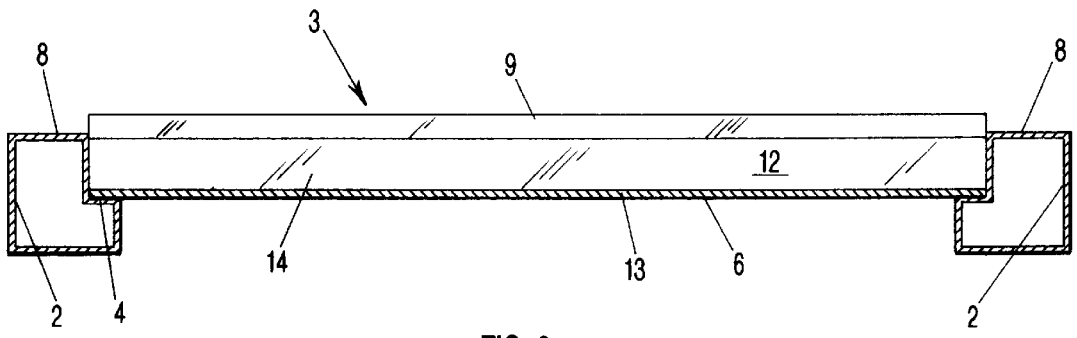
FIG. 3 shows a sectional view according to the section plane III—III of FIG. 2.

As shown in FIG. 2, the horizontal beam 2 is comprised of a hollow profiled member which is provided with a step at a side facing the profiled shelf 3. The profiled shelf 3 rests on the step 4 with the respective free end so that the profiled shelf 3, cut to the right length, can be simply inserted from above between the two horizontal beams with its ends resting on the beams 2. An additional securing of the profiled shelf 3, e.g., by screws or other fastening elements, is not required. For transmitting the weight forces onto the horizontal beam 2, the profiled shelf 3 is provided with abutment surfaces 5 which rest directly on the step 4 of the horizontal beam 2. Two abutment surfaces 5 extend along the lateral edges of the profiled shelf 3, and a further support surface 6 positioned within the same horizontal plane is positioned within the center of the profiled member. For receiving goods or pieces or packages to be stored, the profiled shelf 3 is provided with a plurality of horizontal bearing surfaces 7. The height of the step 4 of the horizontal beam 2 is such that the bearing surface 7 of the profiled shelf 3 is approximately flush with the upper side 8 of the horizontal beam 2 when the profiled shelf 3 with its abutment surfaces 5 and the support surface 6 rests on the step 4.

FIG. 2 shows that the profiled shelf 3 is provided along its lateral edges with guide surfaces 9 which project past the plane of the bearing surfaces 7 and thus also project past the upper side 8 of the horizonal beam 2. The guide surfaces 9 provide lateral guiding for the goods 10 positioned on the bearing surfaces 7 of the profiled shelf 3 during the preferably automatic displacement along the shelf bottom. Since the upper side 8 of the horizontal beam 2 is approximately flush with the bearing surfaces 7, in these areas a continuous transition is provided so that the goods 10 can be moved along the shelf bottom by pulling or pushing without catching on the horizontal beam 2.

With the aid of FIG. 4 all details of the cross-sectional design of the profiled shelf 3 will be explained. The profiled shelf 3 is comprised of a single sheetmetal piece of 0.5, at most 2 mm, thickness by multiple bending action. The sheet-metal piece is formed symmetricallt to the central plane of symmetry 11 and is compprised of the bearing surfaces 7 arranged on either side of the channel 12. The channel bottom 13 has the function of a further support surface 6. The channel 12, which is comprised of the channel bottom 13 as well as two lateral walls 14, is embodied as a rectangular structure in order to provide the highest possible stability. Each one of the bearing surfaces 7 arranged on both sides of the channel 12 is divided by a depression 15 into two separate abutment surfaces. The height of the depression 15 is much smaller than the vertical distance between the bearing surfaces 7 and the support and abutment surfaces 5.6. The depression 15 provides the bearing surfaces 7 overall with a more improved bending resistance in the longitudinal direction of the profiled shelf.

Guide surfaces 9 are connected to the outer sides of the thus provided bearing surfaces 7 and extend at a slant upwardly. The guide surfaces 9 are connected to horizontal section 16 of the C-shape connected there to at a 90° to vertical sections 17. These vertical sections 17 thus connect the horizontal section 16 with the respective outer abutment surface 5 positioned in the same horizontal plane as the centrally arranged support surface 6. The abutment surfaces 5 are provided at their inner edge with a 90° angled portion 18 which forms the outer most edge of the sheet metal strip before being bent into the profiled shelf 3 represented in the drawing.

The edge area of the profiled shelf 3 in a first approximation can be viewed as a C-shape. The upper end of this C-shape is trapezoidal and is comprised a horizontal section 16 from which extends at an angle in the downward direction the guide surface 9. The connection between the upper and the lower sections of the C-shape is then in the form of a vertical section 17. The lower portion of the vertical section 17 forms together with the externally positioned abutment surface 5 and the 90° angled portion 18 the lower section of the C-shape.

The disclosed profiled shelf 3 is especially advantageous because of its increased bending resistance which is primarily the result of the cross-sectional structure comprised of rectangular box profiles. Furthermore, the profiled member has an improved favorable load distribution.

Figure 4:
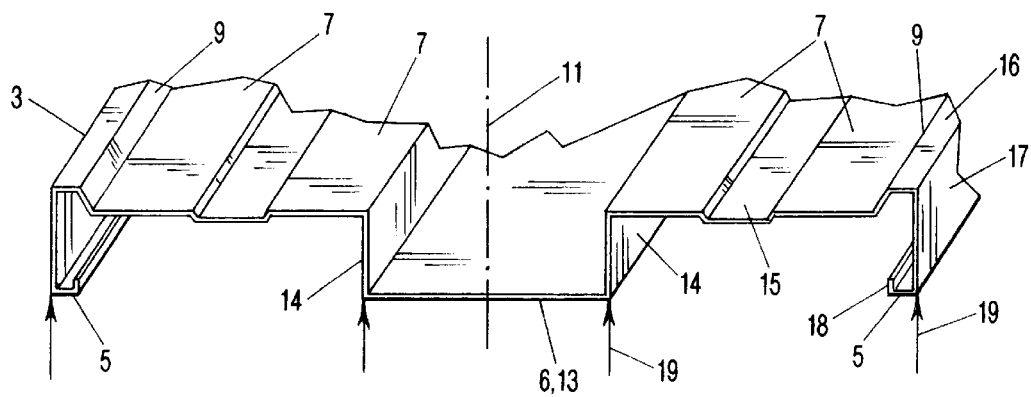
FIG. 4 shows a in a perspective end view the shelf bottom used in the invenrtive shelf system with the representation of the reaction forces transmitted from the horizontal beam onto the shelf bottom.

The reactional forces resulting from loading are to be compensated by the horizontal beams and are identified in FIG. 4 by reference numeral 19. These reactional forces 19 act in those vertical planes in which the two outer vertical sections 17 as well as the side walls 14 of the channel 12 are positioned. For providing a uniform force introduction over the entire width of the profiled shelf the widths of the channel should be between 20 and 30% of the complete width of the profiled shelf 3.

Figure 5:
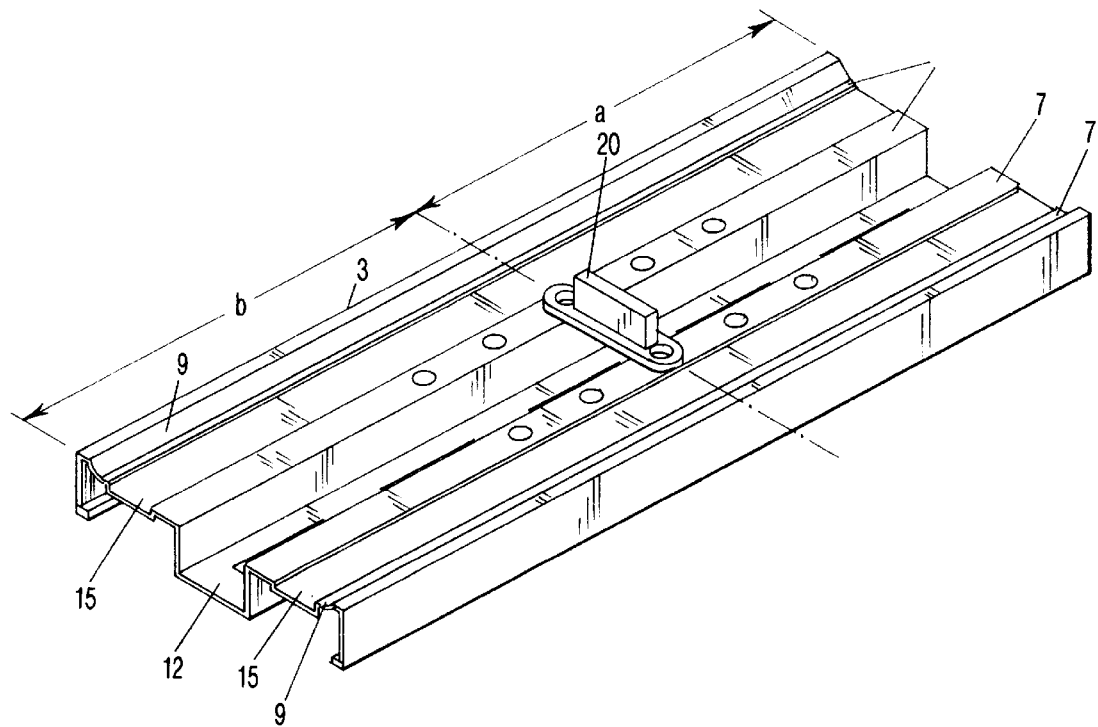
FIG. 5 is a perspective representation of a further variant of the shelf bottom with a travel limiter.

FIG. 5 shows that the shelf bottom is provided with a travel limiter of 20 that projects past the plane of the bearing surfaces 7 and divides the complete length of the bearing surface into two sections a and b that can be individually loaded with goods.

Figure 6:
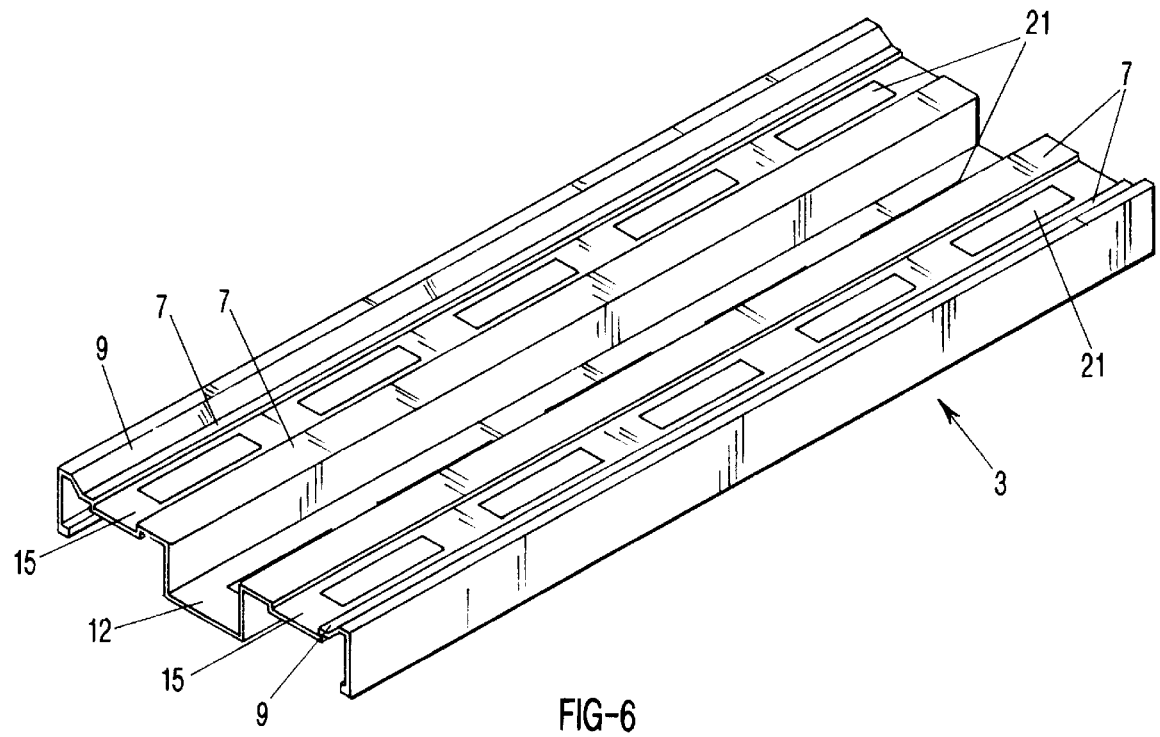
FIG. 6 is a perspective representation of a further variant of the shelf bottom with a plurality of openings.

According to FIG. 6, the profiled shelf 3 can be provided with openings 21 at the bottom 13 of the channel 12 as well as with depressions 15 via which in the case of fire water can drain. The openings 21 are produced by stamping the sheet metal before bending it into the profiled shelf. The resulting sharp edges are without consequence because the bearing surfaces 7 themselves and also the guide surfaces 9 are not provided with such openings.

Figure 7:
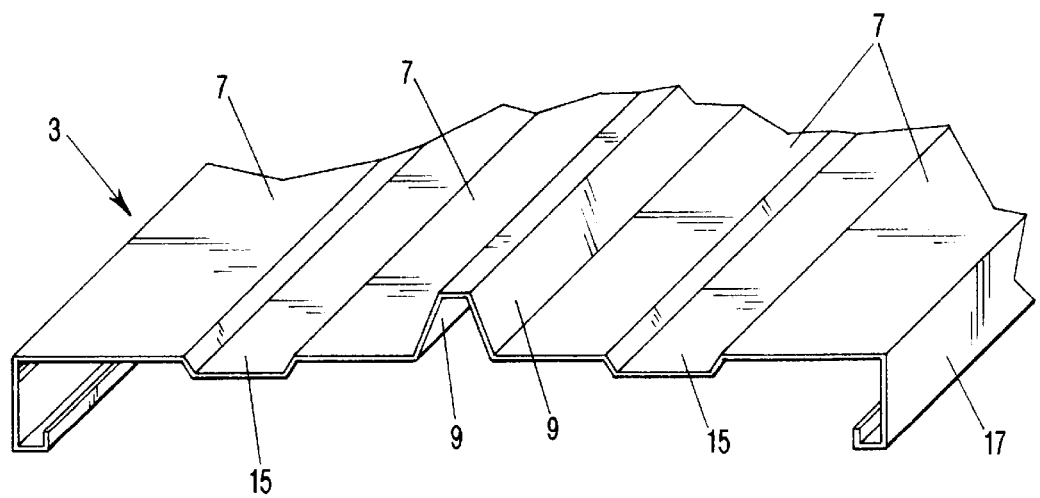
FIG. 7 is a perspective end view of a further embodiment of a shelf bottom whereby the guide surfaces are arranged centrally on the shelf bottom.

FIG. 7 shows a further embodiment. The guide surfaces 9 are not positioned along the longitudinal edges of the shelf bottom 3 but along its central plane II. To the left and to the right the bearing surfaces 7 are arranged which are again provided with depressions 15. The shelf bottom according to FIG. 7 is also provided as an integral part. In contrast to the shelf bottoms represented in FIGS. 1–6 not all of the bearing surfaces 7 provide supporting action for the same row of goods but for goods into adjacent rows. Thus, two of the shelf bottoms 3 represented in FIG. 7 define a compartment into which a row of goods can be introduced. Preferably, the individual shelf bottoms 3 in the embodiment according to FIG. 7 also abut directly.

The present invention is, of course, in no way restricted to the specific disclosure of the specification and drawings, but also encompasses any modification within the scope of the appended claims.

What I claim is:

1. A storage shelf system comprising:

vertical supports;

horizontal beams connecting said vertical supports;

profiled shelves resting on said horizontal beams;

each one of said profiled shelves having at least one integral bearing surface and integral guide surfaces projecting upwardly past said at least one bearing surface;

wherein said guide surfaces are positioned along opposed first and second longitudinal edges of said profiled shelf;

wherein said first and second longitudinal edges have a C-shape with an upper and a lower leg, wherein an open side of said C-shape faces a vertical center plane of said profiled shelf, wherein said guide surfaces are located at an upper end of said C-shape, and wherein said lower leg of said C-shape is an abutment surface positioned below said at least one bearing surface and resting on said horizontal beams for supporting said profiled shelf on said horizontal beams.

2. A shelf system according to claim 1, wherein said guide surface provided at said upper end of said C-shape is a slanted surface extending downwardly from said upper leg toward said vertical center plane, wherein said upper leg extends horizontally, and wherein said C-shape has a vertical portion positioned opposite said open end and connecting said upper leg and said abutment surface.

3. A shelf system according to claim 1, comprising a support surface, wherein two of said bearing surfaces are provided and wherein said support surface is located between said two bearing surfaces.

4. A shelf system according to claim 3, further comprising a channel having a channel bottom, said channel positioned between said two bearing surfaces and lowered relative to said bearing surfaces, wherein said two bearing surfaces are positioned within a common plane, and wherein said support surface is located at said channel bottom.

5. A shelf system according to claim 3, wherein said support surface has openings distributed evenly across a surface area of said support surface.

6. A shelf system according to claim 5, wherein each one of said bearing surfaces is comprised of two portions and a depression arranged between said two portions, wherein said depression has openings distributed evenly across a bottom surface of said depression.

7. A shelf system according to claim 6, wherein said two portions of said bearing surface are free of openings.

8. A shelf system according to claim 1, further comprising a travel limiter projecting upwardly past said at least one bearing surface for dividing a length of said at least one bearing surface into two sections that can be independently loaded with goods.

9. A shelf system according to claim 1, wherein:

said horizontal beams have a step for receiving the ends of said profiled shelves, wherein said ends have abutment surfaces that are placed onto said steps;

the at least one bearing surface is substantially flush with an upper surface of said horizontal beams; and said guide surfaces project upwardly past said upper surface of said horizontal beams.

10. A shelf system according to claim 1, wherein:

said guide surfaces extend centrally in a longitudinal direction of said profiled shelf and face away from one another;

said bearing surfaces are positioned to the right and to the left of said guide surfaces.

* * * * *